United States Patent
Li et al.

(10) Patent No.: US 7,380,005 B1
(45) Date of Patent: May 27, 2008

(54) SYSTEMS, METHODS AND COMPUTER PROGRAM PRODUCTS FOR IMPROVING PLACEMENT PERFORMANCE OF MESSAGE TRANSFORMS BY EXPLOITING AGGRESSIVE REPLICATION

(75) Inventors: Ying Li, Mohegan Lake, NY (US); Robert E. Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/943,150

(22) Filed: Nov. 20, 2007

(51) Int. Cl.
*G06F 15/173* (2006.01)
*G06F 9/46* (2006.01)

(52) U.S. Cl. .................... 709/226; 718/101; 718/102; 718/104; 718/105; 718/106

(58) Field of Classification Search ............... 709/226; 718/101, 102, 104, 105, 106
See application file for complete search history.

(56) References Cited

U.S. PATENT DOCUMENTS

| | | |
|---|---|---|
| 2001/0037409 A1* | 11/2001 | Ricciulli ................ 709/310 |
| 2005/0251556 A1 | 11/2005 | Ginis et al. |
| 2005/0251811 A1 | 11/2005 | Ginis et al. |
| 2006/0087986 A1* | 4/2006 | Dube et al. .............. 370/255 |
| 2006/0224668 A1 | 10/2006 | Ginis |
| 2007/0174233 A1 | 7/2007 | Ginis et al. |
| 2007/0297327 A1* | 12/2007 | Strom ..................... 370/230 |

* cited by examiner

*Primary Examiner*—Bunjob Jaroenchonwanit
*Assistant Examiner*—Philip C Lee
(74) *Attorney, Agent, or Firm*—Cantor Colburn LLP; Mark Wardas (57) ABSTRACT

Systems, methods and computer program products for improving overall end-to-end runtime latency of flow graphs of message transformations which are placed onto an overlay network of broker machines by aggressively replicating stateless transformations. Exemplary embodiments include a method including defining a message transformation graph, receiving information about measured and estimated properties of a message flow, receiving information about physical brokers and links in the overlay network onto which the message transformation graph is deployed, labeling each of a plurality of stateless transformations associated with the flow graph as replicable, heuristically determining a number of replicas and a corresponding load partitioning ratios among the number of replicas for each stateless transformation, converting the message transformation graph into an enhanced flow graph, running a placement algorithm with the enhanced flow graph and consolidating each of the plurality of virtual replicas that are assigned to a common message broker.

5 Claims, 7 Drawing Sheets

SYSTEMS, METHODS AND COMPUTER PROGRAM PRODUCTS FOR IMPROVING PLACEMENT PERFORMANCE OF MESSAGE TRANSFORMS BY EXPLOITING AGGRESSIVE REPLICATION

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND OF THE INVENTION

1. Field of the Invention

This invention relates to event stream processing, and particularly to systems, methods and computer program products for improving placement performance of message transformations by exploiting aggressive replication.

2. Description of Background

Currently, it is a continuing challenge to placing computational components of an event stream processing application onto a network of servers. (The computational components are sometimes also called "tasks", "mediations", or "(stream) transformations"; and the servers are sometimes also called "brokers".)

SUMMARY OF THE INVENTION

Exemplary embodiments include a method for improving overall end-to-end runtime latency of flow graphs of message transformations which are placed onto an overlay network of broker machines by aggressively replicating stateless transformations, the method including defining a message transformation flow graph including computational nodes and edges, receiving information about measured and estimated properties of a message flow associated with the transformation graph, receiving information about physical brokers and links in an overlay network onto which the message transformation graph is deployed, labeling each of a plurality of stateless transformations associated with the message transformation graph as replicable, heuristically determining the number of replicas and the corresponding load partitioning ratios among these replicas for each of the replicable stateless transformations, converting the message transformation graph into an enhanced flow graph having a plurality of virtual replicas of each of the plurality of replicable stateless transformations, and having a plurality of additional data partitioning filter transformations configured to partition the workload for each of the plurality of stateless transformations labeled as replicable, running a placement algorithm with the enhanced flow graph to generate an optimal assignment of the transformations in the enhanced flow graph to brokers in the overlay network, and consolidating each of the plurality of virtual replicas that are assigned to a common message broker.

This invention improves and builds upon an earlier patented invention "Methods and Apparatus for Efficiently Placing Stream Transforms Among Broker Machines Comprising an Overlay Network in a Publish-Subscribe Messaging System", U.S. Patent 20060224668, which is herein incorporated by reference in its entirety. Specifically, this earlier invention proposed a method for placing a transformation flow graph onto a network of broker machines by exploiting queuing models and a hill-climbing optimization technique. The objective was to minimize the average end-to-end latency. We refer to it as the "foundational invention" hereinafter.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which replicates individual stateless transformations onto multiple brokers, assigns varying percentages of workload to these replicas, and chooses the number, location, and workload percentages of these replicas as part of the overall problem of assigning computational components of a message transformation flow graph to brokers in an overlay network, in a way such that the expected overall end-to-end latency will be minimized. Exemplary embodiments provide more flexible choices of placement and improved performance.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein replicate individual stateless transformations onto multiple brokers, assign varying percentages of workload to these replicas, and choose the number, location, and workload percentages of these replicas as part of the overall problem of assigning computational components of a message transformation flow to brokers in an overlay network, in a way such that the expected overall end-to-end latency will be minimized. Exemplary embodiments provide more flexible choices of placement and improved performance.

In exemplary embodiments, a message transformation flow graph including computational nodes (transformations) and edges is defined. Information about measured or estimated properties of the flow, including: message rates into each transformation, message size, CPU utilization per message in each transformation, and the expected number of output messages per input message, is identified. Information about the physical brokers and links in the overlay network onto which this flow is deployed, including: CPU capacity of each broker, link capacity and link latency is further identified.

In exemplary embodiments, one or more of the transformations in the flow graph are labeled as replicable. Typically, "stateless" transformations, such as filters or XSLT transformations, that can process messages independently of knowing the past history of the messages, are replicable. In exemplary embodiments, the original message transformation graph is then converted into an enhanced flow graph by replicating each of the replicable transformations using heuristically pre-determined number of replicas and corresponding load partitioning ratios among these replicas for each of these replicable transformations. Specifically, the enhanced flow graph includes multiple "virtual" replicas of each replicable transformation, as well as additional transformations (data partitioning filters) serving to partition the workload intended for the original replicable transformation to each of the replicas. In exemplary embodiments, the placement algorithm which applies queuing model and the hill-climbing optimization techniques as described in the foundational invention is run with such enhanced flow graph to generate an optimal solution to the assignment of the transformations in the enhanced flow graph to brokers in the overlay network. Replicas assigned to the same broker are then consolidated. For instance, if there are 10 virtual replicas of a transformation, and 6 are assigned to one broker and 4 to another, then in the final deployment, there are a total of two actual replicas. Under an assumption of equal distribution for each virtual replica, the workload would then be distributed as 60% and 40% between the actual replicas.

In exemplary embodiments, each of the n virtual replicas is assigned an equal weight. However, such an assignment limits the number of novel possibilities that can be explored by the hill-climbing algorithm. In the above example, there are $10!/(6!4!)$ possible assignments all producing the same 60%-40% allocation of work. The coverage of the algorithm can be improved by choosing different weight for different virtual replica based on certain criteria. An example of such criterion could be to minimize the mean squared sum of the gaps between possible allocations.

In exemplary embodiments, the replication is performed in one of two alternative ways, namely, in either a combinatorial way or in a constrained way. As each of them has its own pros and cons, one can decide which approach to use based on specific requirements.

In exemplary embodiments, the placement algorithm could be run for multiple times where at each time, a different enhanced transformation graph will be used with a change of the number of replicas as well as the load partitioning ratios among these replicas for each stateless replicable transformation.

Figure 1A:
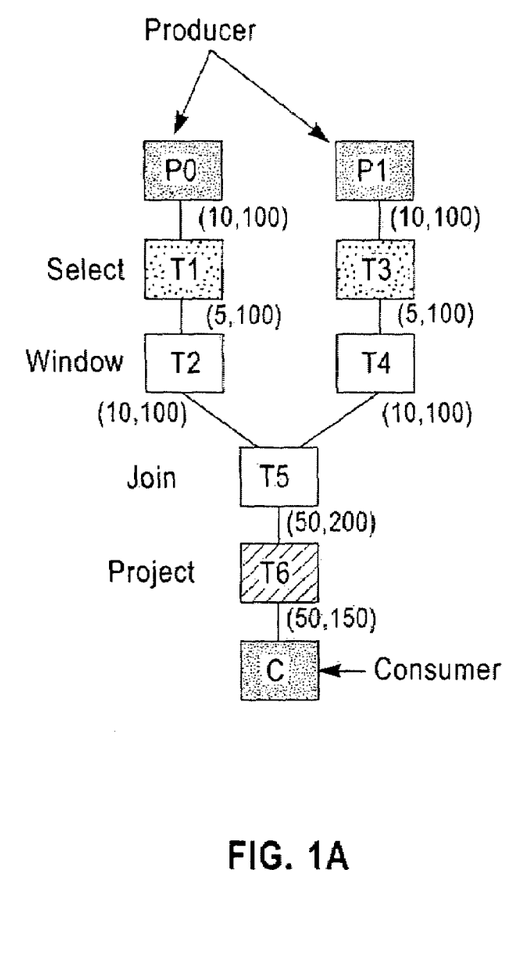
FIG. 1a illustrates a transformation graph in accordance with exemplary embodiments.

FIG. 1a shows a transformation graph which contains six relational operators in total (note that, since each operator or transformation performs a certain task, it can also be referred to as a task). Specifically, $P_0$ and $P_1$ are two producers, and C is the consumer. Tasks $T_1$ and $T_3$ are two select operators, $T_2$ and $T_4$ are two windowing operators, $T_5$ performs a join operation and $T_6$ is a project operator. Thus, there are totally three stateless operators in this graph: $T_1$, $T_3$ and $T_6$, which are replicable.

Figure 1B:
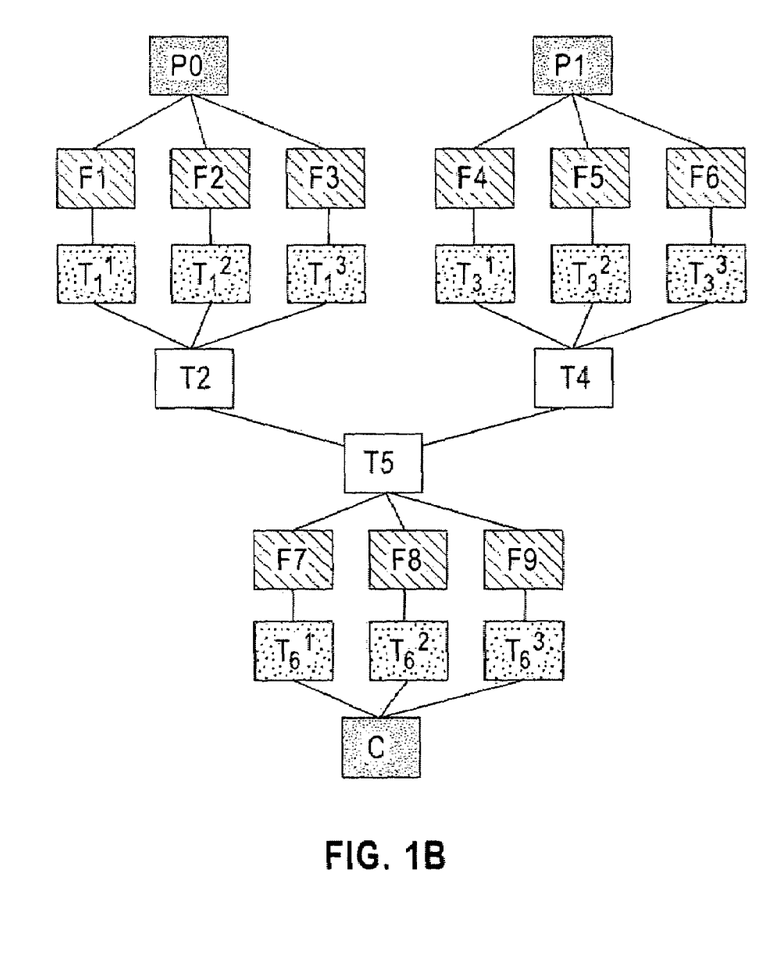
FIG. 1b illustrates an enhanced transformation graph derived from FIG. 1a in accordance with exemplary embodiments.

FIG. 1b shows the derived transformation graph where each of the above three stateless operators has been replicated with three replicas. Note that tasks F1 to F9 are filter transformations which function as data partitioners. Various data partitioning functions could be used in this case such as round-robin, key-range and hash-partitioning.

In exemplary embodiments, the placement algorithm as described in the foundational invention is run with this enhanced transformation graph to find the optimal task-to-broker assignment. However, some adjustment to its objective function, which was defined in terms of the average end-to-end latency, is performed in the following two aspects: (1) the end-to-end latency between a producer P and a consumer C is now calculated by taking all possible paths between P and C into account. In the foundational invention, however, only the shortest path between P and C is considered, which is inappropriate; and (2) the processing capacity of each broker machine is now taken into account when calculating the flow latency. In the foundational invention, all brokers are assumed to have the same processing power.

Figure 2A:
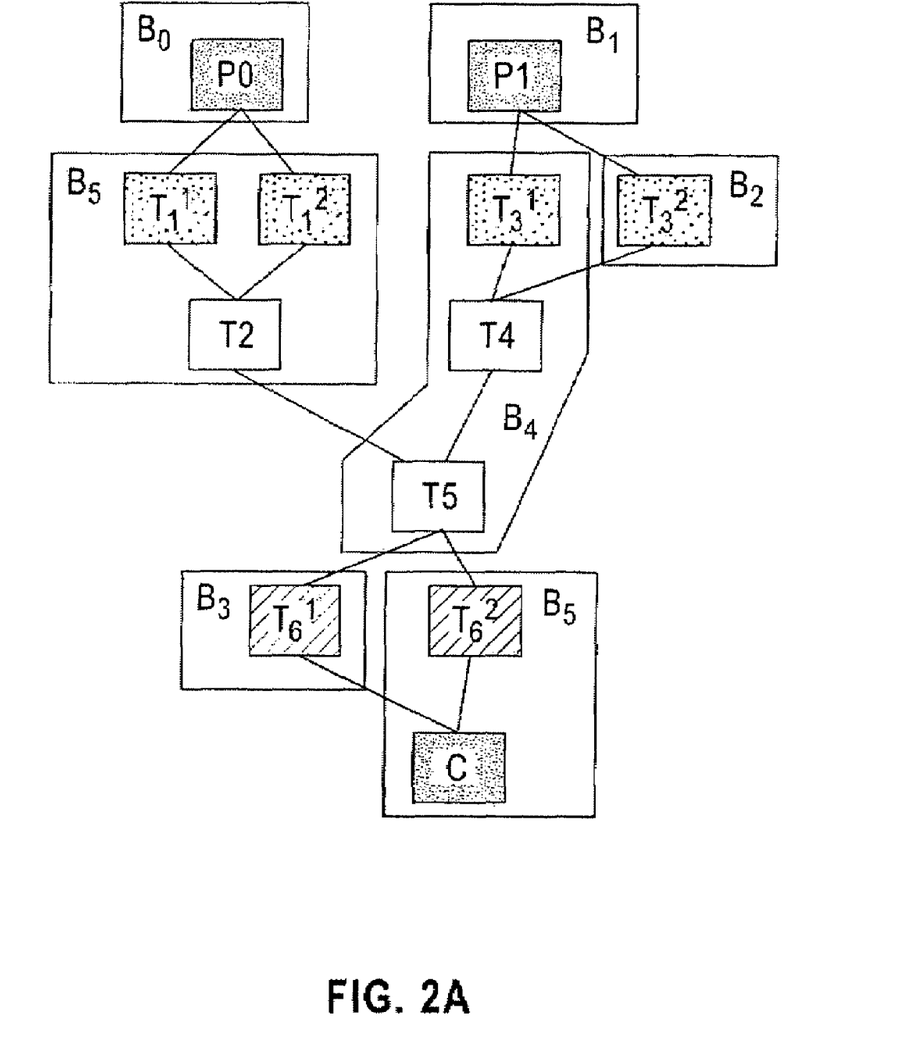
FIG. 2a illustrates a task-to-broker assignment in accordance with exemplary embodiments.

FIG. 2a shows the task-to-broker assignment obtained after running the placement algorithm with a transformation graph enhanced from FIG. 1a. Here, for simplicity, the filter transformations introduced for load partitioning purpose have been omitted. In the figure, both of $T_1$'s replicas have been assigned to the same broker, which means that no replication is necessary for this task. In contrast, the two replicas of task $T_3$ are assigned to two different brokers, similarly for those of task $T_6$. The load partitioning in this case, is half and half for each replica of $T_3$ and $T_6$ (assuming an equal weight for each replica of $T_3$ and $T_6$).

Figure 2B:
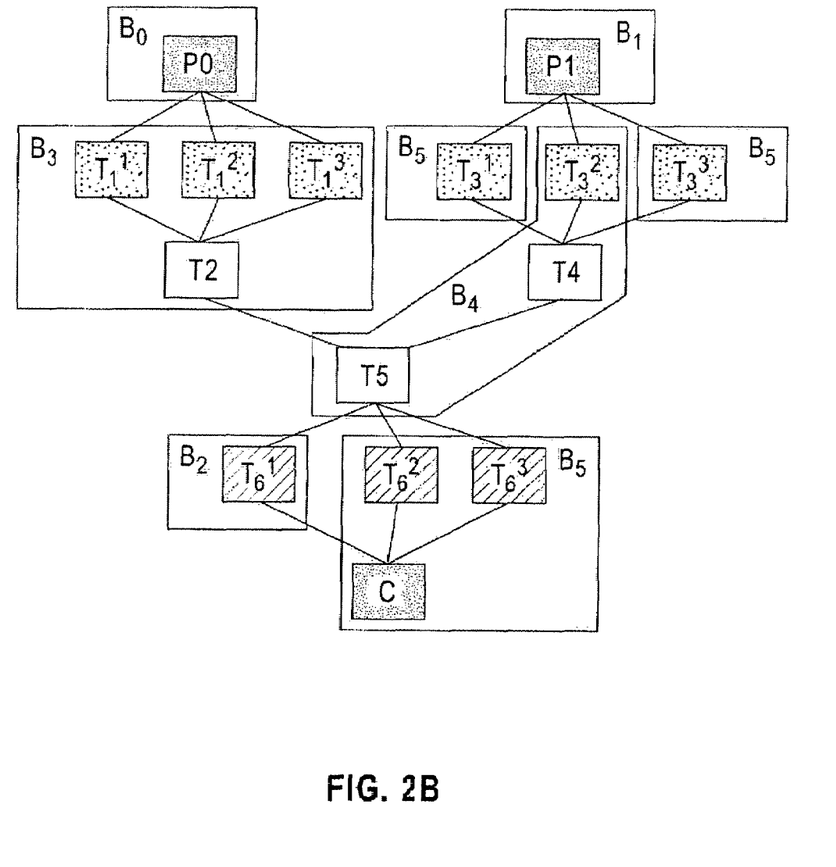
FIG. 2b illustrates another task-to-broker assignment in accordance with exemplary embodiments.

FIG. 2b shows the task-to-broker assignment for the 3-replica case, where all three replicas of task $T_1$ are still assigned to the same broker. In addition, two of $T_3$'s three replicas are assigned to broker 5, and the rest one replica to broker 4. Since the messages emitting from $P_1$ are equally divided among $T_3^1$, $T_3^2$ and $T_3^3$, this placement has actually assigned ⅔ of the incoming messages from $P_1$ to broker 5, and ⅓ to broker 4. Equally, this assignment could be viewed as replicating $T_3$ into two copies with one copy receiving two thirds of the messages, and the other one third. Apparently, by varying the number of replicas for each stateless operator, different options for optimally partitioning the input data can be explored.

Figure 3A:
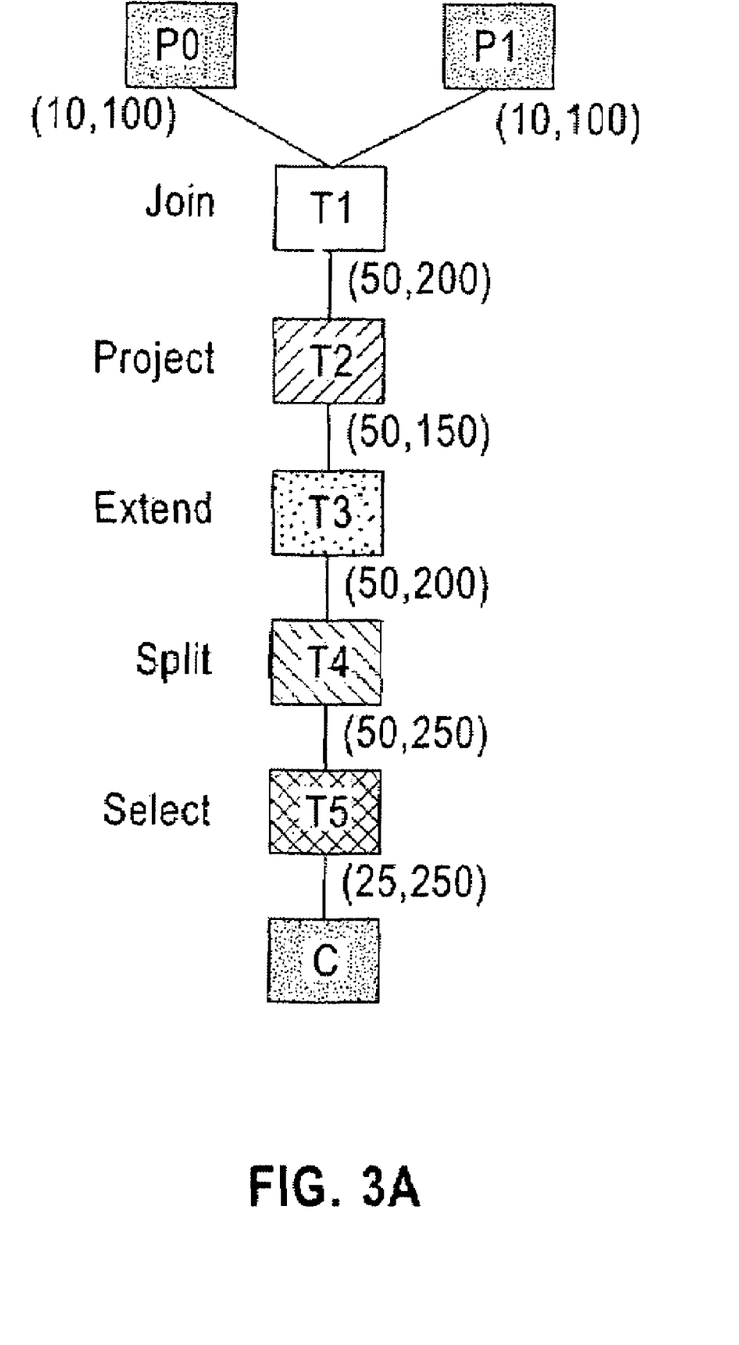
FIG. 3a illustrates a transformation graph in accordance with exemplary embodiments.
Figure 3B:
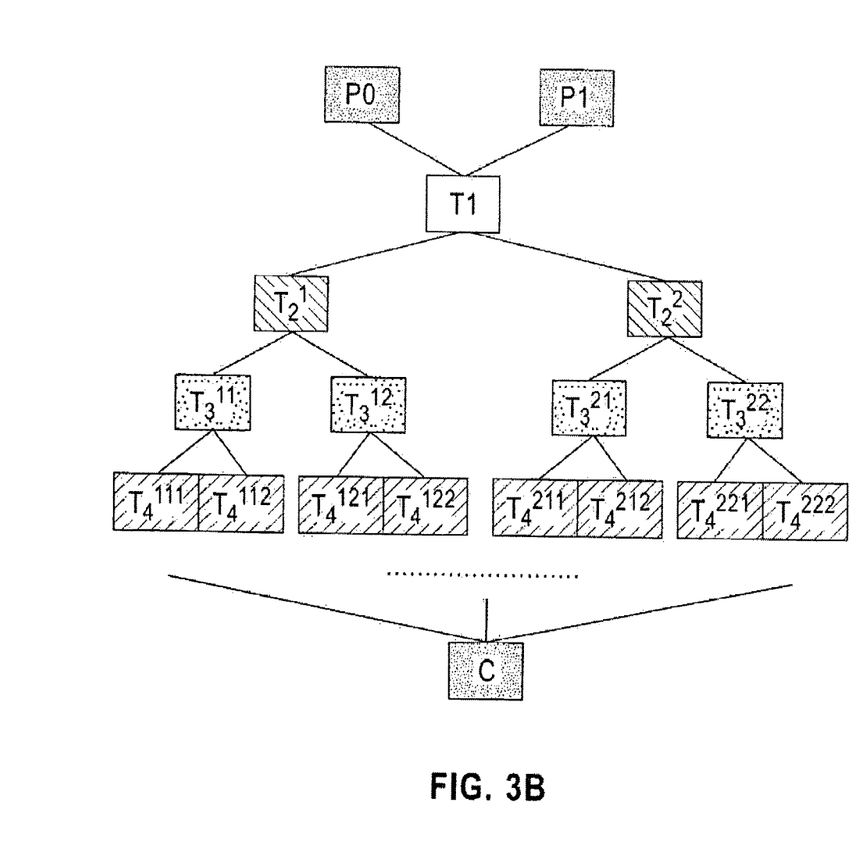
FIG. 3b illustrates an enhanced transformation graph derived from FIG. 3a with combinatorial replication in accordance with exemplary embodiments.
Figure 3C:
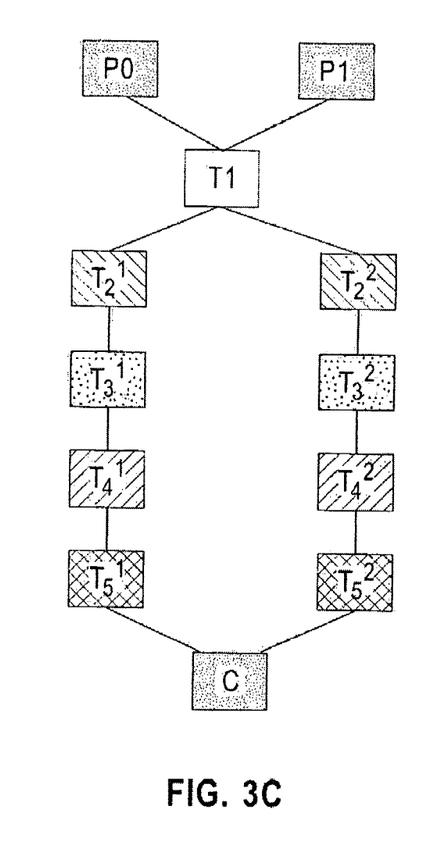
FIG. 3c illustrates an enhanced transformation graph derived from FIG. 3a with constrained replication in accordance with exemplary embodiments.

In exemplary embodiments, the replication can be performed in two different ways, namely, in combinatorial way and in constrained way. In particular, by combinatorial replication, the task replication is carried out in a combinatorial way when there are consecutive stateless operators. On the contrary, in case of constrained replication, a simple path replication is performed for subsequent stateless operators. FIG. 3a shows a transformation graph where $T_2$ to $T_5$ are consecutive stateless operators. FIG. 3b shows the enhanced transformation graph after all these tasks are replicated combinatorially. Apparently, the number of tasks has rapidly increased in this case even when there are only two replicas for the top task $T_2$. In contrast, FIG. 3c shows the graph where task $T_2$ is also replicated into two copies, yet for the tasks $T_3$ to $T_5$, only the paths from $T_2$ to $T_5$ are replicated, which consequently results in a much fewer number of tasks than the combinatorial case. This is thus considered as a constrained replication.

Comparing these two replication approaches, a better performance may be expected from the combinatorial approach, as its larger number of tasks provides the placement algorithm more freedom in assigning tasks to brokers. Nevertheless, combinatorial replication can render a huge number of tasks, especially when there are several cascaded stateless operators in the graph, which consequently results in a high computation cost. A tradeoff between the performance gain and the computation cost has to be made in this case.

Figure 4:
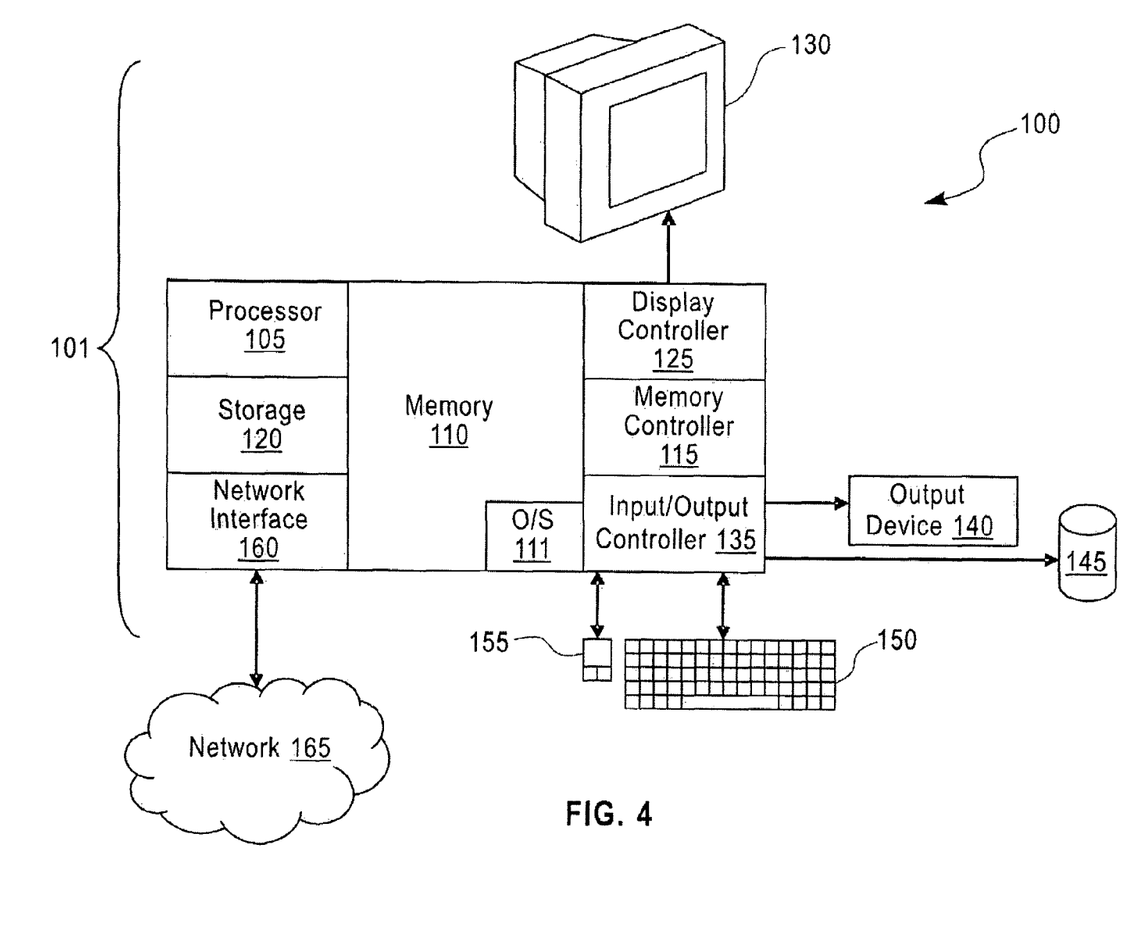
FIG. 4 illustrates an exemplary embodiment of a system for improving the performance of placing a message transformation graph by exploiting aggressive replication.

FIG. 4 illustrates an exemplary embodiment of a system 100 for improving the performance of placing message transformations by exploiting aggressive replication. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 4, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 4, the software in the memory 110 includes the message transformation replication methods described herein in accordance with exemplary embodiments and a suitable operating system (O/S) 111. The operating system 111 essentially controls the execution of other computer programs, such as the message transformation systems and methods described herein, and provides scheduling, input-output control, file and data management, memory management, and communication control and related services.

The message transformation replication methods described herein may be in the form of a source program, executable program (object code), script, or any other entity comprising a set of instructions to be performed. When it is a source program, then the program needs to be translated via a compiler, assembler, interpreter, or the like, which may or may not be included within the memory 110, so as to operate properly in connection with the O/S 111. Furthermore, the message transformation replication methods can be written with an object oriented programming language, which has classes of data and methods, or a procedure programming language, which has routines, subroutines, and/or functions.

In exemplary embodiments, a conventional keyboard 150 and mouse 155 can be coupled to the input/output controller 135. The I/O devices 140, 145 may include devices, such as, but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the O/S 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The message transformation replication methods described herein and the O/S 111, in whole or in part, but typically the latter, are read by the processor 105, perhaps buffered within the processor 105, and then executed.

When the systems and methods described herein are implemented in software, as is shown in FIG. 4, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The message transformation replication methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the message transformation replication methods are implemented in hardware, the message transformation replication methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In exemplary embodiments, the processes can also inquire or accept a grace period input by a user of the computer 101. The grace period can be a time period after which all traffic to and from the computer ceases if no further activity has been sensed by the processes. In this way, if a user has left the computer 101 for an extended period of time or has left the computer (e.g., after a work day), the computer 101 no longer allows traffic to and from the computer 101. In an alternative implementation, the computer 101 can totally power down after the grace period has expired. In further exemplary embodiments, the processes can accept traffic only from a common network maintenance control system that provides limited services.

Figure 5:
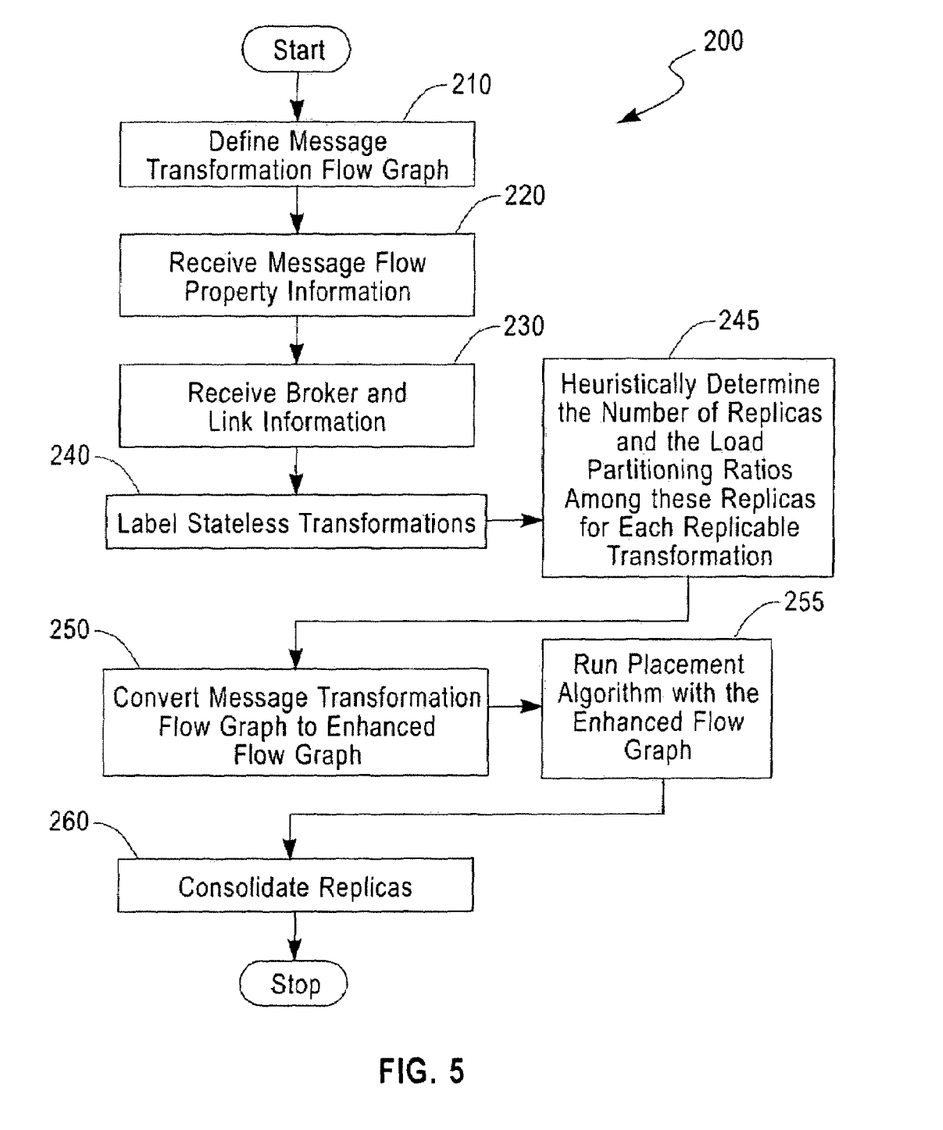
FIG. 5 illustrates a flow chart of a method for improving the performance of placing a message transformation graph by exploiting aggressive replication in accordance with exemplary embodiments.

FIG. 5 illustrates a flow chart of a method 200 for improving overall end-to-end runtime latency of flow graphs of message transformations by exploiting aggressive replication in a system 100 coupled to an overlay network of broker machines such as the network 165. At block 210, the method 200 defines a message transformation flow graph including computational nodes and edges. At block 220, the method 200 receives information about measured and estimated properties of a message flow associated with the flow graph. At block 230, the method 200 receives information about physical brokers and links in the overlay network onto which the message transformation graph is deployed. At block 240, the method 200 labels each of stateless transformations associated with the message transformation graph as replicable. At block 245, the method 200 determines the number of replicas and the corresponding load partitioning ratios among these replicas for each of the replicable stateless transformations. At block 250, the method 200 converts the message transformation flow graph into an enhanced flow graph having virtual replicas of each of the replicable stateless transformations, and having additional data partitioning filter transformations configured to partition the workload for each of the stateless transformations labeled as replicable. At block 255, the placement algorithm as described in the foundational invention is run with the enhanced flow graph to generate an optimal assignment of the transformations in the enhanced flow graph to brokers in the overlay network. At block 260, the method 200 consolidates each of the virtual replicas that are assigned to a common message broker.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system coupled to an overlay network of broker machines, a method for placing message transformations on the broker machines to improve end-to-end performance, the method consisting of:

defining a message transformation flow graph including computational nodes and edges;

receiving information about measured and estimated properties of a message flow associated with the message transformation flow graph;

receiving information about physical brokers and links in the overlay network onto which the message transformation flow graph is deployed, wherein the information about the physical broker and links are selected from a group consisting of: CPU capacity of each of the physical brokers, link capacity and link latency;

labeling each of a plurality of stateless transformations associated with the message transformation flow graph as replicable;

heuristically determining a number of replicas and a corresponding load partitioning ratios among the number of replicas for each of the plurality of replicable stateless transformations;

converting the message transformation flow graph into an enhanced flow graph having a plurality of virtual replicas of each of the plurality of replicable stateless transformations, and having a plurality of additional data partitioning filter transformations configured to partition a workload for each of the plurality of stateless transformations labeled as replicable;

running a placement algorithm with the enhanced flow graph to generate an optimal assignment of the message transformations in the enhanced flow graph to the broker machines in the overlay network; and consolidating each of the plurality of virtual replicas that are assigned to a common message broker.

2. The method as claimed in claim 1 wherein the information about measured and estimated properties of a message flow associated with the flow graph, are selected from a group consisting of: message rates into a message transformation, message size, CPU utilization per message in each transformation, and expected number of output messages per input message.

3. The method as claimed in claim 2 wherein the message transformation flow graph is converted into the enhanced flow graph by replicating the plurality of replicable stateless transformations with the heuristically determined number of replicas and the corresponding load partitioning ratios among the number of replicas for each of the plurality of replicable stateless transformations.

4. The method as claimed in claim 3 wherein the placement algorithm uses an objective function based on expected overall end-to-end latency between producers and consumers.

5. The method as claimed in claim 4 wherein the generated optimal assignment assigns the each of the plurality of replicable stateless transformations to a particular broker, and replicas of each stateful transformation to one or more brokers, together with a percentage of message traffic destined for the each of the plurality of replicable stateless transformations that is to be routed to the replicas of the each of the plurality of replicable stateless transformations.

* * * * *